Patented Dec. 22, 1953

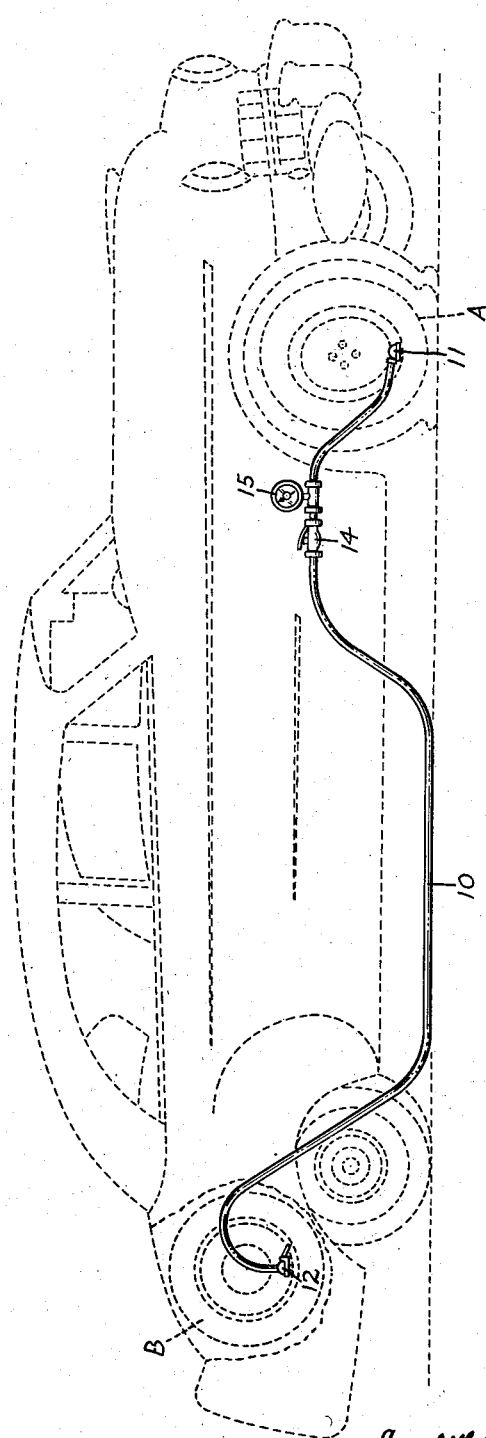

2,663,348

UNITED STATES PATENT OFFICE 2,663,348

TIRE INFLATOR

Clayton Farris, East Orange, N. J., assignor to The Trucktor Corporation, Westfield, N. J., a corporation of Delaware Application September 16, 1949, Serial No. 116,076

1 Claim. (Cl. 152—415)

This invention relates to devices and methods for inflating the pneumatic tires of vehicles such as automobiles, trucks, busses and the like.

It frequently happens that, during the use of a vehicle, a slow leak develops in one of the tires of the vehicle. If convenient means for inflating the tire were available, the tire could be reinflated so that the vehicle could be driven to a nearby garage or service station where the tire could be changed and repaired.

The operators of motor vehicles do not, however, usually have a tire pump by means of which the soft or under inflated tire could be inflated, or, for that matter, much of an inclination, because of the work involved, to use such a pump, even if it were available. A number of devices are sold whereby a tire may be inflated without exertion but even these devices are not too satisfactory because of the mechanical problems involved. For example, it has been suggested that by means of a suitable hose coupling, hose chuck and adapter kit, it is possible to connect the hose to one cylinder of the engine of the vehicle by removing a spark plug and inserting the adapter in the spark plug opening. For the mechanically minded, this device is quite satisfactory, but many people do not care or know how to go through the necessary mechanical manipulations to connect the hose to the engine and to the tire.

Engine operated pumps have been suggested but these pumps are expensive and must be coupled directly to the engine which results in high installation costs.

In accordance with my invention, I utilize the air in the spare tire of the vehicle for inflating the leaking or under inflated tire. In order to produce the necessary pressure and supply of air, it is only necessary to inflate the spare tire to 60 to 100 pounds pressure in order to make available sufficient pressure to completely inflate one of the tires on the vehicle. To connect the spare tire to the under inflated tire, I have provided a simple hose coupling of a type disclosed more particularly in the single figure of the drawing, which shows a vehicle, in dotted lines, and the new hose coupling connecting the spare tire to an under inflated tire.

Referring now to the drawing, the hose coupling system may consist of an elongated piece of flexible tubing 10 of the type commonly used in the tire inflating systems of garages, which is provided at one end with a conventional air chuck 11 adapted to introduce the air into the under inflated tire A. The opposite end of the hose is provided with a clip on type of air chuck 12 such as the Schrader clip on air chuck which can be applied to the valve stem of the spare tire B and connected thereto so that air can be withdrawn from the spare tire and supplied to the under inflated tire.

For convenience in use, the hose may be provided with a manually operated air valve 14 of conventional type and a pressure gauge or tire gauge 15 between the valve and the air chuck 11 to indicate the pressure in the tire.

In use, the spare tire B is inflated to about 60 to 100 pounds pressure at a garage or filling station to supply air pressure of a magnitude sufficient to inflate a completely flat or partially deflated tire. If the tire A develops a leak, the clip chuck 12 may be clipped to the valve stem of the spare tire B and the air chuck 11 applied to the valve stem of the under inflated tire A. By opening the air valve 14, the surplus air in the spare tire B may be introduced into the under inflated tire, thereby bringing it up to a pressure sufficiently high that the vehicle may be driven a substantial distance to a garage or filling station where the tire may be repaired.

The use of high air pressure in the spare enables a leaky tire to be inflated at least once without reducing the pressure in the spare tire so low as to prevent its use if it should become necessary to change tires on the vehicle.

It will be understood that the coupling and hose connections are susceptible to considerable change and that any conventional type of air or clip chuck may be used at the ends of the hose or that threaded couplings may be used for connecting the hose to the tires A and B. Moreover, any conventional type of control valve, tire gauge or pressure gauge, combined valve, gauge and air chuck or a pressure-balanced valve which automatically closes when the pressure in the leaking tire is increased to about 25 pounds per square inch may be used as desired. Therefore, the form of the invention disclosed herein should be considered as illustrative and not as limiting the scope of the following claim.

I claim:

A device for inflating an under inflated tire on a vehicle with air from a spare vehicle tire comprising an air hose, a clip on air chuck on one end of said hose having means for fixing it to the valve stem of said spare tire, another air chuck at the other end of the hose for introducing air into the under inflated tire, a manually operated air valve in said hose adjacent to said another air chuck for admitting air to said under inflated tire, and a pressure gauge connected to said hose between said air valve and said another air chuck.

CLAYTON FARRIS.

References Cited in the file of this patent

UNITED STATES PATENTS

| Number | Name | Date |
|---|---|---|
| 936,813 | Rohrbacher | Oct. 12, 1909 |
| 1,142,772 | Lipman | June 8, 1915 |
| 1,259,431 | Nelson | Mar. 12, 1918 |
| 1,475,252 | Swanjord | Nov. 27, 1923 |
| 1,492,838 | Dilweg | May 6, 1924 |
| 2,237,559 | Jenne | Apr. 8, 1941 |
| 2,278,664 | Mitchell | Apr. 7, 1942 |

FOREIGN PATENTS

| Number | Country | Date |
|---|---|---|
| 242,792 | Great Britain | Nov. 19, 1925 |